(12) United States Patent
Nagae

(10) Patent No.: US 7,197,705 B1
(45) Date of Patent: Mar. 27, 2007

(54) ELECTRONIC MAIL APPARATUS

(75) Inventor: Takaaki Nagae, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/522,686

(22) Filed: Mar. 10, 2000

(30) Foreign Application Priority Data

Aug. 30, 1999 (JP) ................. 11-243872

(51) Int. Cl.
G06F 15/00 (2006.01)
G06F 17/00 (2006.01)

(52) U.S. Cl. .................. 715/535; 715/536; 715/542; 715/523

(58) Field of Classification Search ............... 715/536, 715/542, 535, 523
See application file for complete search history.

(56) References Cited

U.S. PATENT DOCUMENTS

| | | | |
|---|---|---|---|
| 5,428,458 A * | 6/1995 | Aiba et al. ............ | 358/434 |
| 5,781,714 A * | 7/1998 | Collins et al. .......... | 345/471 |
| 5,826,219 A * | 10/1998 | Kutsumi ................ | 704/4 |
| 5,911,776 A * | 6/1999 | Guck .................... | 709/217 |
| 5,966,685 A * | 10/1999 | Flanagan et al. ........ | 704/8 |
| 6,119,077 A * | 9/2000 | Shinozaki .............. | 704/3 |
| 6,119,137 A * | 9/2000 | Smith et al. ........... | 715/523 |
| 6,134,305 A * | 10/2000 | Takenaka et al. ....... | 379/100.13 |
| 6,167,439 A * | 12/2000 | Levine et al. .......... | 709/217 |
| 6,189,045 B1 * | 2/2001 | O'Shea et al. .......... | 709/246 |
| 6,456,400 B1 * | 9/2002 | Ikegami et al. ......... | 358/434 |
| 6,651,039 B1 * | 11/2003 | Ikuta et al. ............ | 704/4 |
| 6,788,430 B1 * | 9/2004 | Emoto .................. | 358/1.16 |

FOREIGN PATENT DOCUMENTS

| | | |
|---|---|---|
| EP | 0552960 A1 | 7/1993 |
| JP | 63099665 A | 4/1988 |
| JP | 64-41066 | 2/1989 |
| JP | 02056148 A | 2/1990 |
| JP | 02056172 A | 2/1990 |
| JP | 02202143 A | 8/1990 |
| JP | 4-364630 | 12/1992 |
| JP | 10-55356 | 2/1998 |
| JP | 10-149359 | 6/1998 |
| JP | 11066075 A | 3/1999 |

OTHER PUBLICATIONS

Jackson, William; SinaNet uses proprietary technology to translate Chinese text messages; Jun. 29, 1998; Cahners Publishing Associates; Government Computer News, v17, n19, p. 52(1).*
Communication identifying European Search Report dated Apr. 23, 2004.

* cited by examiner

*Primary Examiner*—Heather R. Herndon
*Assistant Examiner*—N Hillery
(74) *Attorney, Agent, or Firm*—Staas & Halsey LLP

(57) ABSTRACT

According to an electronic mail apparatus of the present invention, when a sentence serving as the contents of an electronic mail written in Japanese cannot be text-displayed in a destination of the electronic mail, a text file corresponding to the sentence is converted into a bit map file serving as image data, and the bit map file is transmitted to the destination of the electronic mail. In this manner, even if Japanese cannot be text-displayed in the destination, an electronic mail written in Japanese can be read in the destination.

6 Claims, 14 Drawing Sheets

ADDRESS LIST    52

| TRANSMISSION TARGET | ADDRESS LIST | MAIL ADDRESS | MOTHER TONGUE | DISPLAY IN JAPANESE |
|---|---|---|---|---|
| ■ | Bob | bob@xxxx.com | ENGLISH | NG |
| ■ | Mizel | mizel@xxxx.de | GERMAN | OK |
| □ | YAMADA | yamada@xxxx.jp | JAPANESE | OK |
| ... | ... | ... | ... | ... |

FIG. 9

(A)
```
Hello
こんにちは。
How Are you?
元気にしてましたか？
    fine
私は元気です。
    ?????
今日はどしゃぶりでした。
    ...
```

(B)
```
Gooden Tag.
こんにちは。
Be get es inun?
元気にしてましたか？
    good
私は元気です。
    ?????
今日はどしゃぶりでした。
    ...
```

ELECTRONIC MAIL APPARATUS

BACKGROUND OF THE INVENTION

1. Field of the Invention

The present invention relates to an electronic mail apparatus.

2. Prior Art

In recent years, electronic mails rapidly spread in a world-wide scale. In addition, in accordance with global development of enterprises, the importance of electronic mails increases. Persons having friends residing in foreign countries increase in number, and persons having different mother tongues are frequently in correspondence with each other with electronic mails.

An electronic mail can be transmitted to anyone in the world in an environment which can be connected to a network. For this reason, if the difficulties of communication caused by differences between languages can be canceled, it is supposed that the electronic mails can be fixed as convenient tools which can be easily used by anyone.

However, Japanese is expressed by hiragana, katakana, and kanji. For this reason, the number of types of characters to be expressed is several thousands to several tens of thousands. For this reason, in Japan, a 2-byte character code is used to express one character.

In contrast to this, English is expressed by only roman letters (alphabets). The number of types of alphabets is fifty-two. For this reason, in a country (e.g., in the U.S.A.) using English as its mother tongue, a 1-byte character code (8-byte code) is used to express one character (e.g., the ASCII code).

In contrast to this, German is expressed by roman letters and characters obtained by adding umlauts to the roman letters. For this reason, the number of types of used characters is larger than English. Therefore, in Germany, in order to express one character, a 1.5-byte character code is used.

As described above, since the types of used characters are different in number depending on languages. For this reason, in the world, the byte counts of several types of character codes are used.

A character display device (e.g., a personal computer, a work station, a mobile computer, a mobile telephone set, or the like) for text-displaying characters by using character codes handles character codes (text data) which can express the language of a country in which the device is used.

However, since character codes which are handled by the character display device are different from each other, the following problem occurs. In general, character codes which can be handled by the character display device are limited to character codes which can text-display the language of a country in which the device is used.

For this reason, the character display device cannot text-display characters by using character codes except for the character codes which can be handled by the device. For this reason, since a character display device used in the U.S.A. can handle only 1-byte character codes, the character display device cannot handle 1.5-byte and 2-byte character codes. More specifically, Japanese and German cannot be text-displayed.

In addition, some character codes having equal byte counts have difference character codes which can be handled (Japanese, Korean, and the like). In such a case, the same problem as described above occurs.

Therefore, for example, it is assumed that a Japanese people forms an electronic mail in Japanese to transmit the electronic mail to her/his friend residing in the U.S.A. In this case, when a character display device used by the friend can receive only 1-byte character codes, the character display device cannot text-display the contents of the electronic mail.

In this manner, character codes (text data) corresponding to the contents of the electronic mail can be transmitted and received in the world. However, when the character codes cannot be handled on the reception side, the contents of the electronic mail cannot be text-displayed on the reception side.

SUMMARY OF THE INVENTION

It is an object of the present invention to provide an electronic mail apparatus which can read an electronic mail formed in a language used on a transmission side on a reception side even if characters expressed in the language used in the transmission side can be displayed on the reception side.

The present invention is an electronic mail apparatus comprising: an image data forming unit using a sentence input as the contents of an electronic mail to form image data corresponding to the sentence; and a transmission unit transmitting the formed image data to a destination of the electronic mail.

In an electronic mail system, most of computers used as terminal devices can handle image files (e.g., bit map files) and can display images based on the image files. More specifically, the image files can be handled in common in all computers in almost the whole world.

According to the present invention, the image data of a sentence constituting the contents of the electronic mail are transmitted. For this reason, for example, when characters expressed in a language used in a transmission source cannot be text-displayed on a reception side, an image based on the image data can be displayed. Therefore, on the reception side, the sentence of the electronic mail based on the image data can be displayed. The receiver of the electronic mail can read the text of the electronic mail from the image of the sentence using characters expressed in the language used in the transmission source.

The present invention further comprises a check unit checking whether a sentence should be transmitted as text data or image data, and the image data forming unit may form image data corresponding to the sentence by using the sentence if it is determined by the check unit that the image data should be transmitted.

In addition, in the present invention, the check unit may determine that the sentence should be transmitted as image data if it is determined that the text data of the sentence is not correctly displayed.

The present invention further comprises a display control unit displaying a sentence on a screen by using the text data of a sentence, and the image data forming unit may form image data corresponding to the sentence in a format of the sentence displayed on the screen by the display control unit.

The present invention further comprises a translation unit translating, when a sentence is expressed in a language different from a language used in a destination of the electronic mail, the sentence into the language used in the destination. The transmission unit may transmit translation results obtained by the translation unit to the destination of the electronic mail.

In the present invention, the image data forming unit may form translation image data of the translation results expressed by characters written in the language used in the destination when the display control unit cannot text-display characters written in the language used in the destination of the electronic mail, and the display control unit may display the translation image data on a screen such that the translation image data can be edited.

In the present invention, when the display control unit cannot text-display characters written in the language used in the destination of the electronic mail, the image data forming unit forms the translation image data of the translation results expressed by characters written in the language used in the destination. The present invention further comprises a synthesizing unit forming synthesized image data obtained by combining the image data corresponding to the input sentence formed by the image data forming unit to the translation image data, and the transmission unit may transmit the synthesized image data to the destination of the electronic mail.

In the present invention, the transmission unit may transmit the image data as an attached file to the destination of the electronic mail.

According to the present invention, even if characters written in the language used on the transmission side cannot be text-displayed on the reception side, an electronic mail formed in the language used on the transmission side can be read on the reception side.

BRIEF DESCRIPTION OF THE DRAWINGS

FIG. 6 is a diagram showing a display example of an edition region shown in FIG. 5.

FIG. 7 is a table for explaining the address list shown in FIG. 4.

FIG. 9 is a diagram for explaining a process performed by the translation unit shown in FIG. 4.

DETAILED DESCRIPTION OF THE PREFERRED EMBODIMENT

An embodiment of the present invention will be described below with reference to the drawings.

<Electronic Mail System>

Figure 1:
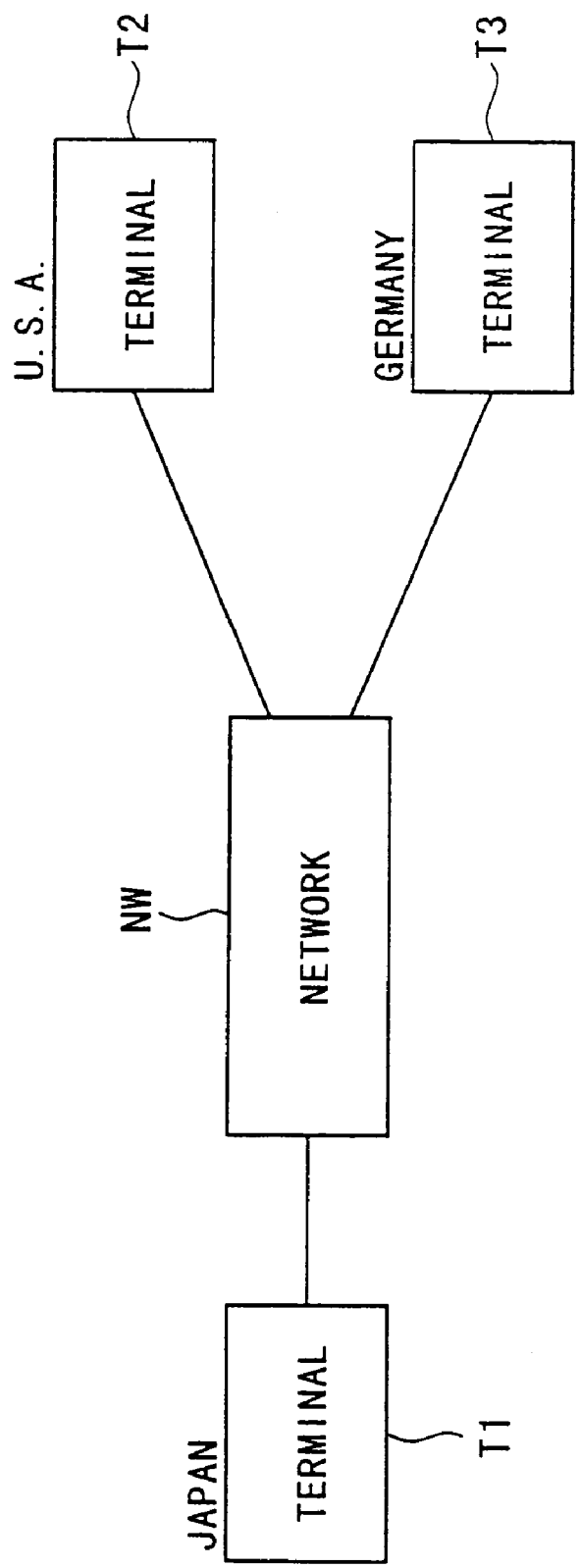
FIG. 1 is a diagram for explaining an electronic mail system according to an embodiment of the present invention.

FIG. 1 is a diagram for explaining an electronic mail system according to an embodiment of the present invention. In FIG. 1, the electronic mail system is constituted by a plurality of terminal devices connected to a network. In FIG. 1, for example, an electronic mail system in which a plurality of terminal devices T1, T2, and T3 are connected to each other through a network NW is shown.

The terminal devices T1, T2, and T3 are, for example, personal computers, work stations, mobile computers (mobile terminals), or mobile telephone sets.

The terminal device T1 is arranged in Japan, and can text-display Japanese and English by using 2-byte character codes. In addition, the terminal device T2 is arranged in the U.S.A., and can text-display only English by using 1-byte character code. Furthermore, the terminal device T3 is arranged in Germany, and can text-display English and German by using 1.5-byte character codes.

Figure 2:
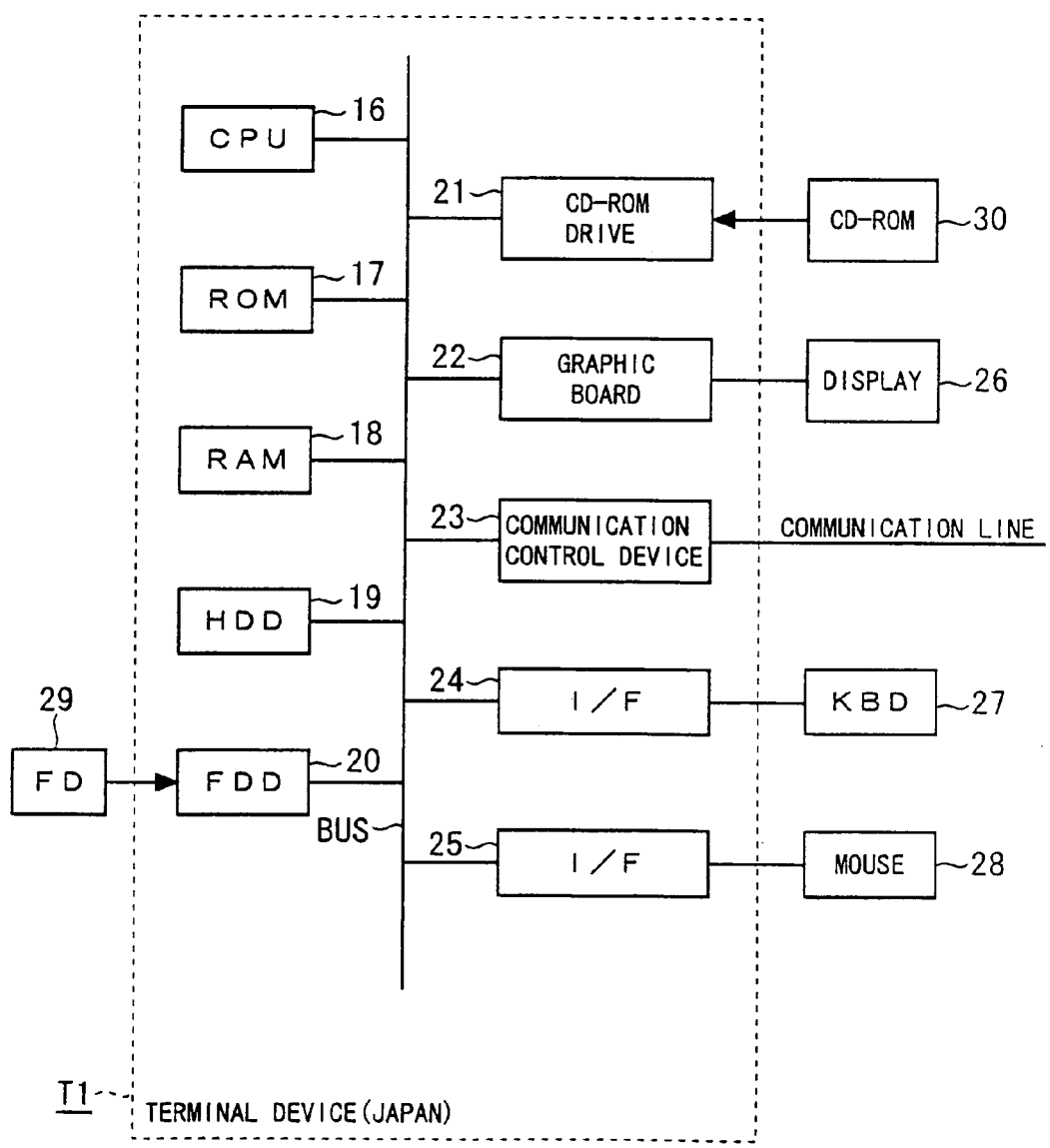
FIG. 2 is a block diagram showing the hardware of the terminal devices shown in FIG. 1.

FIG. 2 is a block diagram showing the hardware of the terminal devices T1, T2, and T3 shown in FIG. 1. Since the terminal devices T1, T2, and T3 have the same hardware configurations, the terminal device T1 will be described for example.

In FIG. 2, the terminal device T1 comprises a CPU (Central Processing Unit) 16, a ROM (Read Only Memory) 17, a RAM (Random Access Memory) 18, a hard disk drive (HDD) 19, a flopply disk drive (FDD) 20, a CD-ROM driver 21, a graphic board 22, a communication control device 23, and interface circuits (I/Fs) 24 and 25 which are connected to each other through a bus BUS.

The graphic board 22 is connected to a display device 41 such as a cathode ray tube (CRT) or a liquid crystal display (LCD). The I/F 24 is connected to a keyboard (KBD) 27. The I/F 25 is connected to a mouse 28 or a pointing device such as a track ball, a flat space, or a joy stick.

The ROM 17 stores a booting program therein. The booting program is executed by the CPU 16 when the terminal device T1 is powered on. In this manner, an operating system (OS) stored in the HDD 19 and a single driver or a plurality of drivers for a display process or a communication process are loaded on the RAM 18 to make it possible to execute various processes and controls.

In the RAM 18, a program for controlling the terminal device T1 is developed. In addition, the RAM 18 holds a process result obtained by a program, temporary data for a process, displaying data for displaying the process result or the like on the screen of the display 26, and the like. The RAM 18 is used as a work region for the CPU 16.

The displaying data developed on the RAM 18 is transmitted to the display 26 through the graphic board 22. The display 26 displays display contents corresponding to the displaying data on the screen of the display 26.

The HDD 19 is a device for recording or reading a program, control data, text data, image data, or the like on/from a hard disk in accordance with an instruction from the CPU 16.

The FDD 20 is a device for recording or reading a program, control data, text data, image data, or the like on/from a floppy disk 29 in accordance with an instruction from the CPU 16.

The CD-ROM driver 21 is a device for reading a program or data recorded on a CD-ROM (read only memory using a compact disk) 30 in accordance with an instruction from the CPU 16.

The communication control device 23 executes transmission/reception of data to/from another device or downloading of a program or data by using a communication line connected to the terminal device T1 in accordance with an instruction from the CPU 16.

The KBD 27 comprises a plurality of keys (character input keys, cursor keys, and the like). The KBD 27 is used to cause an operator to input data in the terminal device T1. The mouse 28 is used to input a selection instruction using a mouse cursor displayed on the display 26.

The CPU 16 executes various types of programs stored in the ROM 17, the hard disk, the FD 29, and the CD-ROM 30 (they correspond to recording media of the present invention). In this manner, the terminal device T1 functions as an electronic mail apparatus according to the present invention. The program and data held in the recording medium such as a hard disk may be manually recorded on the recording medium by the operator, and a program or data may be downloaded from another device to be recorded on the recording medium.

<Process in Terminal Device T1>

Figure 3:
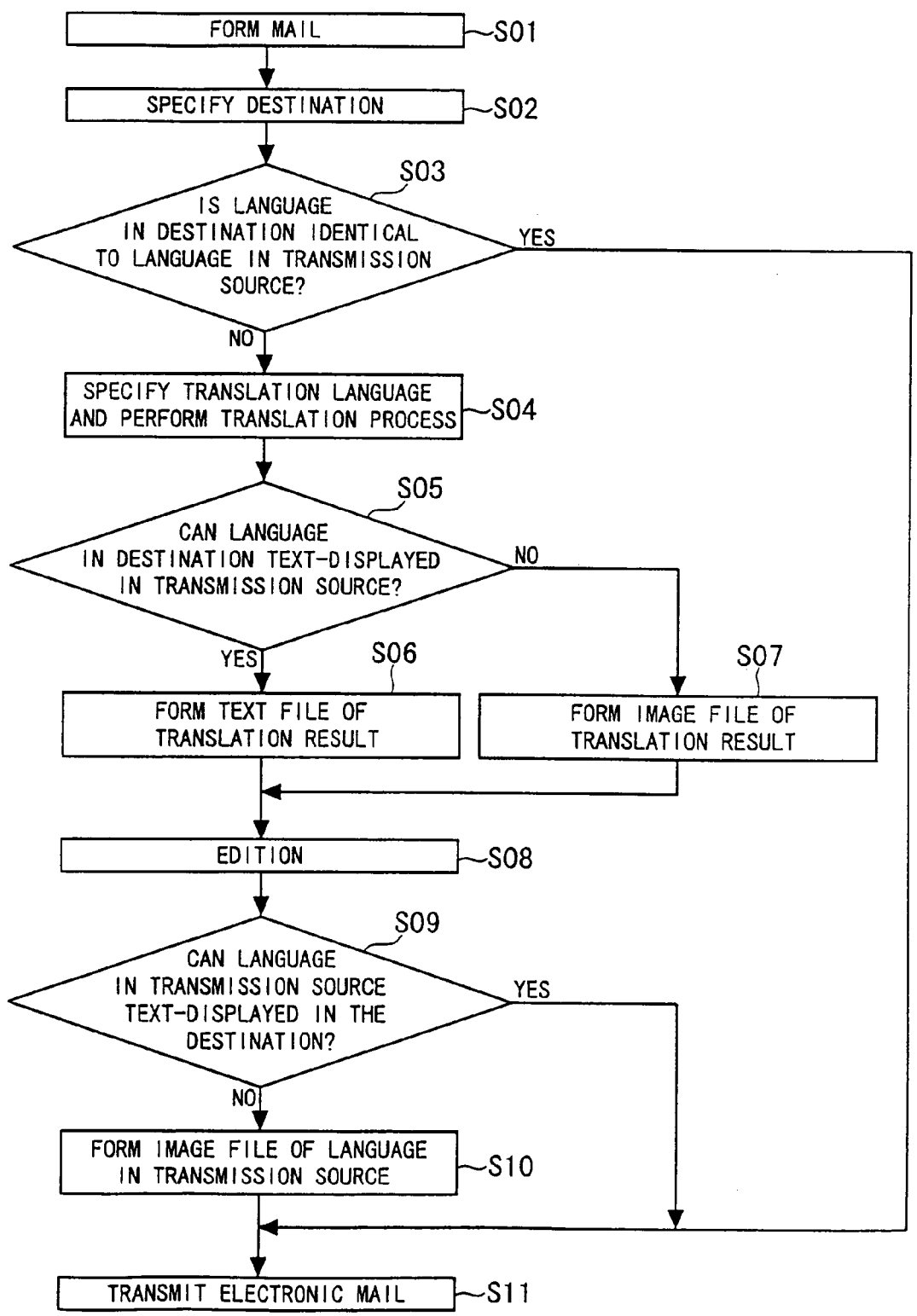
FIG. 3 is a flow chart showing an operation in the terminal device shown in FIG. 2.

The terminal device T1 functions as an electronic mail apparatus for performing the following operation such that the CPU 16 executes a program. FIG. 3 is a flow chart showing an operation in the terminal device T1.

First, an environment for forming an electronic mail in a mother tongue is provided to a user of the terminal device T1 (step S01). More specifically, an environment for forming a sentence constituting the contents of an electronic mail is provided such that the CPU 16 executes an application program of a text editor.

The user operates the KBD 27 in the provided environment to form the sentence of an electronic mail. At this time, the CPU 16 forms a text file corresponding to the formed sentence. The CPU 16 displays the sentence based on the formed text file on the screen of the display 26 in accordance with a predetermined format.

An environment for specifying a destination of an electronic mail is provided to the user (step S02). More specifically, the CPU 16 reads address list 52 (see FIG. 7) of electronic mails recorded on the hard disk or the FD 29 in accordance with an instruction input from the user through the KBD 27 or the mouse 28, and the address list 52 is displayed on the screen of the display 26.

The user refers to the address list 52 selects the address corresponding to the destination by using the KBD 27 or the mouse 28. At this reason, when the address corresponding to the destination is not in the address list 52, the user inputs the corresponding address to the terminal device T1 by using the KBD 27.

It is checked whether a language identical to the language in the transmission source of the electronic mail is used in the destination or not (step S03). At this time, if it is determined that the languages is identical with each other, the operation shifts to step S11. If it is determined that the languages are different from each other, the operation shifts to step S04.

The CPU 16 performs determination by using determination data prepared in advance. In place of this determination, a question whether the language (Japanese) used in the transmission source is identical to the language used in the destination may be provided to the user through the display 26, and the operation may shift to step S11 or step S04 depending on the answer, i.e., "identical" or "different" of the user. Also, the CPU 16 may analyze a language used in the destination on the basis of the address specified in step S02 to automatically checks whether the identical languages are used in the transmission source and in the destination.

In step S04, a language (mother tongue) used in the destination is specified, the sentence formed in step S01 is translated into the specific language. The language may be specified such that the user designates the language, and the CPU 16 may analyze the language on the basis of the address.

In step S05, it is checked whether characters expressed in the language used in the destination can be text-displayed by the terminal device T1 or not. The CPU 16 performs the determination by using the determination data. If it is determined that the characters can be text-displayed, the CPU 16 causes the operation to shift to step S06. If it is determined that the characters cannot be text-displayed, the CPU 16 causes the operation to shift to step S07.

In place of this, in step S05, the CPU 16 may provide a question whether the characters expressed in the language in the destination can be text-displayed or not to the user through the display device 26 to cause the operation to shift to step S06 or S07 depending on an answer, i.e., "it is possible to perform text display" or "it is impossible to perform text display" from the user. The CPU 16 may automatically check whether the characters expressed in the language in the destination can be text-displayed or not on the basis of the address of the destination and character codes which can be handled by the terminal device T1.

In step S06, the CPU 16 forms the text file of results (translation results) of the translation process in step S04 in accordance with the determination result in step S05, and then causes the operation to shift to step S08.

In step S07, the CPU 16 forms the image file (bit map file, JPEG file, GIF file, or the like) of the translation results in step S04 in accordance with the determination result in step S05.

In step S08, the CPU 16 displays an edition screen for an electronic mail on the display device 26. On the edition screen, characters based on the text file of the sentence formed in step S01 and characters (translation results) based on the text file or the image file formed in step 506 or step S07 are displayed. The user refers to the contents displayed on the edition display to perform an editing operation such as correction of mistranslations by using the KBD 27 or the mouse 28.

In step S09, it is checked whether characters expressed in the language (Japanese) used in the transmission source can be text-displayed in the destination or not. If it is determined that the characters can be text-displayed, the operation shifts to step S11; otherwise, the operation shifts to step S10.

This determination in CPU 16 is performed by referring to determination data which is preferred in advance. In place of the determination, the following operation may be performed. That is, the CPU 16 provides a question whether the characters expressed in the language in the transmission source can be text-displayed or not to the user through the display device 26. When the user inputs the answer, i.e., "it is possible to perform text display", the operation shifts to step S11; when the user inputs the answer, i.e., "it is impossible to perform text display", the operation shifts to step S10.

In step S10, the CPU 16 forms an image file corresponding to a text file (sentence formed by characters expressed in the language in the transmission source) formed in step S01, and a synthesized image file obtained by synthesizing the image file with the image file formed in step S07 is formed.

In step S11, the electronic mail formed in steps S01 to S10 is transmitted to an address (terminal device T2 and/or terminal device T3) specified in step S02. The contents of the specified electronic mail are as follows.

(1) When "YES" is determined in step S03, a sentence (Japanese text file) formed in a language in a transmission source is used as the body of an electronic mail.

(2) When "NO" is determined in step S03, and when "YES" is determined in step S06 and step S09, a synthesized text file obtained by synthesizing a Japanese text file and the text file of translation results is used as the body of an electronic mail.

(3) When "NO" is determined in step S03 and step S05, and when "YES" is determined in step S09, the synthesized file obtained by synthesizing the Japanese text file and the image file of the translation results is used as an attached file.

(4) When "NO" is determined in steps S03 and S05 and step S09, the synthesized file obtained by synthesizing the image file of the translation results and a Japanese image file is used as an attached file.

<Detailed Operation of Terminal Device T1>

Figure 4:
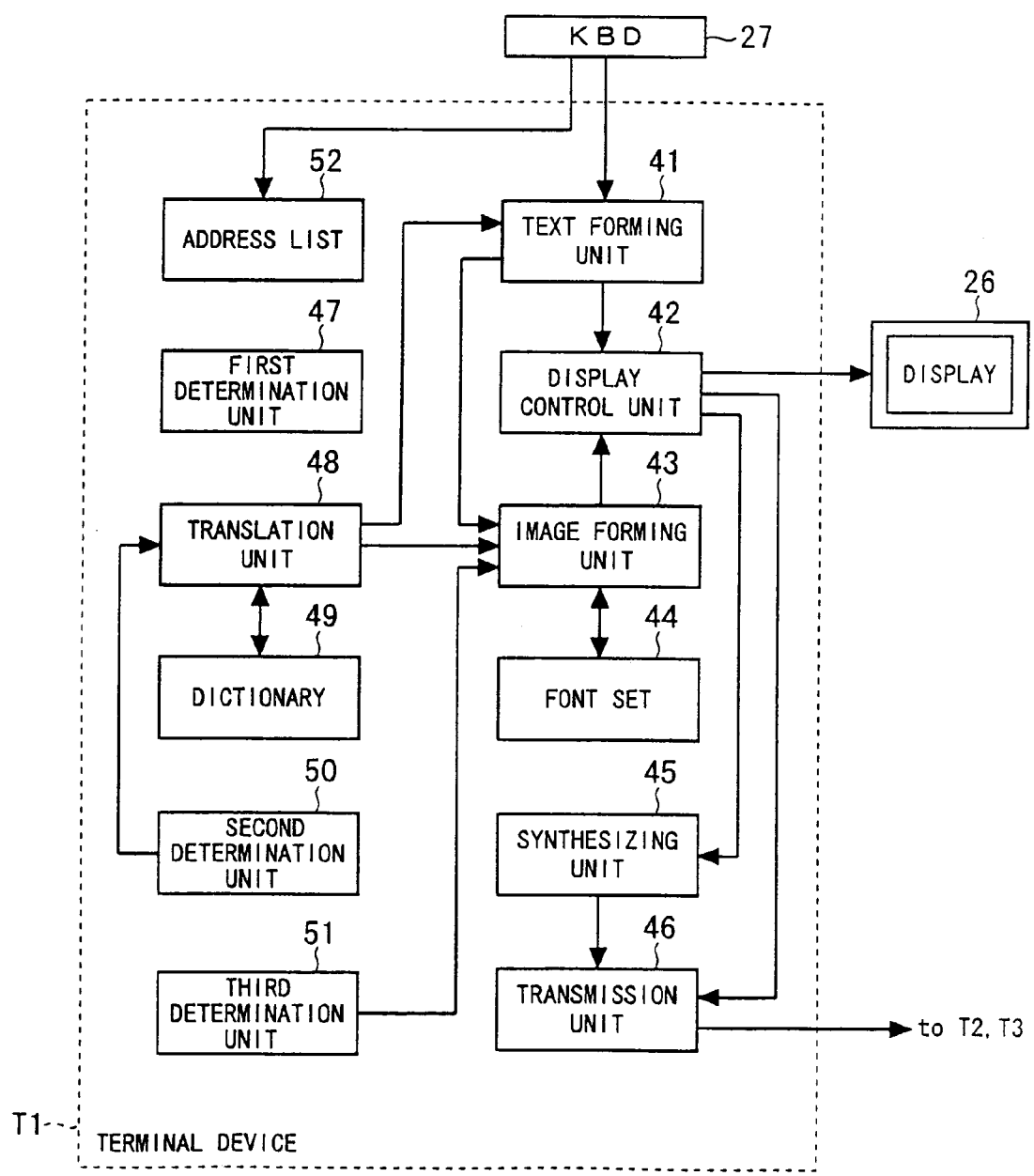
FIG. 4 is a functional block diagram of the terminal device shown in FIG. 2.

FIG. 4 is a functional block diagram of a terminal device T1. When the CPU 16 executes a program to execute the operations in steps S01 to S11, the terminal device T1 functions as a device comprising the display device 41, a display control unit 42, an image forming unit (corresponding to an image data forming unit) 43, a font set (data set of font data) 44, a synthesizing unit 45, a transmission unit 46, a first determination unit 47, a translation unit 48, a dictionary 49, a second determination unit 50, a third determination unit 51, and the address list 52.

Steps S01 to S11 shown in FIG. 3 will be described below by using FIG. 4 to FIG. 16.

<<Step S01>>

In step S01, the display control unit 42 displays the screen (edition screen) of a text editor which copes with n languages used in the electronic mail apparatus on the display device 26.

Figure 5:
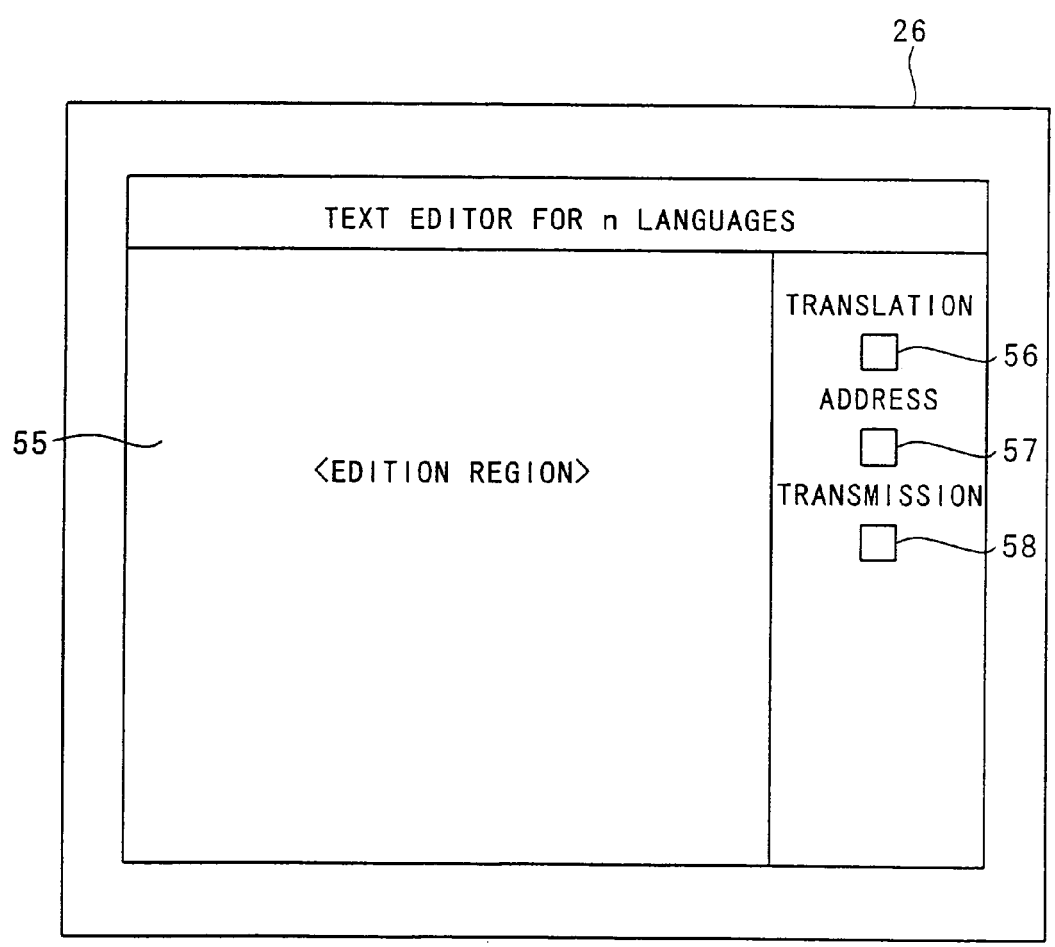
FIG. 5 is a diagram showing a display example of an edition screen obtained by a text editor.

FIG. 5 is a diagram showing a display example of the edition screen obtained by the text editor. In FIG. 5, the edition screen has a rectangular edition region 55, a translation button 56 arranged on the right side of the edition region 55, an address list button 57, and a transmission button 58.

A user designates the position of a cursor (not shown) displayed on the address list button 57 with the KBD 27 or the mouse 28 to input a Japanese sentence constituting the contents of an electronic mail from the KBD 27.

At this time, the display device 41 forms text data corresponding to the input characters. More specifically, the display device 41 has a data set (font set) of fonts corresponding to the JIS (Japan Industrial Standards) code. Font data corresponding to the character code of the characters input from the KBD 27 is extracted from the font set to form text data.

The display control unit 42 displays the Japanese characters corresponding to the formed text data in the edition region 55 in accordance with the information of a predetermined format (document style). In this manner, the sentence constituting the contents of the electronic mail is formed in Japanese. The text file corresponding to this sentence is formed by the display device 41.

FIG. 6 is a diagram showing a display example in which formed sentences are displayed in the edition region 55. As shown in FIG. 6, the formed sentences are text-displayed in the edition region 55 at intervals each corresponding to one line.

The display device 41 is a function realized such that the CPU 16 executes the program of the text editor, and the display control unit 42 is a function realized such that the CPU 16 controls the graphic board 22 according to a predetermined control program.

<<Step S02>>

In step S02, a user clicks the address list button 57 displayed on the edition screen with the mouse 28 (or presses the address list button 57 by operating the KBD 27). At this time, the address list 52 recorded on the hard disk or the FD 29 is read, and the contents of the address list 52 are displayed on the display device 26.

FIG. 7 is a table for explaining an example of the address list 52. As shown in FIG. 7, the address list 52 is constituted by a plurality of records including pieces information corresponding to the respective items, i.e., "transmission target", "address list", "mail address", "mother tongue", and "display in Japanese".

In this example, the mail addresses of "Bob" residing in the U.S.A. and having the terminal device T2, "Mizel" residing in Germany and having the terminal device T3, and "Yamada" residing in Japan are registered.

The user operates the KBD 27 or the mouse 28 to check records, so that the user can selects a transmission target (destination). At this time, the user can select a plurality of destinations. When the plurality of destinations are selected, a formed electronic mail is multi-casted to the destinations. In this example, it is assumed that "Bob" and "Mizel" are selected as destinations.

<<Step S03>>

In step S03, the first determination unit 47 checks whether the language in the transmission source is identical to the languages in the destinations selected in step S02 or not. More specifically, the first determination unit 47 holds information representing that the language in the transmission source is Japanese to check whether the "mother tongue" in the record checked in step S02 is Japanese or not.

As described above, the first determination unit 47 automatically performs determination by using the language (Japanese) in the transmission source prepared as determination data and the information of "mother tongue" of the address list 52. When the language in the transmission source is different from the language in the destination (the language in the destination is not Japanese), the first determination unit 47 notifies the translation unit 48 that the languages are different from each other. In contrast to this, when the language in the destination is Japanese, the first determination unit 47 does not notify the translation unit 48.

In this example, the first determination unit 47 determines that the languages of "Bob" and "Mizel" are not Japanese, and the first determination unit 47 notifies the translation unit 48 that the languages are not Japanese. The first determination unit 47 is a function realized such that the CPU 16 executes a program.

<<Step S04>>

In step S04, the translation unit 48 is started by receiving the notification from the first determination unit 47 to perform the following processes. That is, the translation unit 48 specifies a language to be translated with reference to "mother tongue" in the record corresponding to the destination in which it is determined that the language is not Japanese.

In this manner, the translation unit 48 specifies the language (mother tongue) of the destination "Bob" as English, and specifies the language (mother tongue) of the destination "Mizel" as German. In this example, although the translation unit 48 specifies a language to be translated, the first determination unit 47 may specifies the language to be translated to notify the translation unit 48 of the language.

Subsequently, the translation unit 48 translates a sentence in Japanese (Japanese sentence) formed in step S01 into a specific language with reference to the dictionary (basic dictionary) 49. In this case, the dictionary 49 is constituted by dictionaries of n languages such as a Japanese-English dictionary or a Japanese-Germany dictionary for translating Japanese into a foreign language.

The translation unit 48 extracts words or idioms of one sentence when the translation unit 48 translates a Japanese sentence, and translates the extracted words and idioms into the foreign language corresponding to the mother tongue in the destination. When the words or the idioms are extracted, for example, decomposition of parts of speech is performed by explosion morpheme analysis, and a translation for a specific part of speech (e.g., noun or verb) is performed.

The translation unit 48 allocates data representing an impossible translation to a word which is not described in the dictionary 49. The translation unit 48 may translate not only the words and idioms in one sentence but also the whole sentence in place of the process described above.

Figure 8:
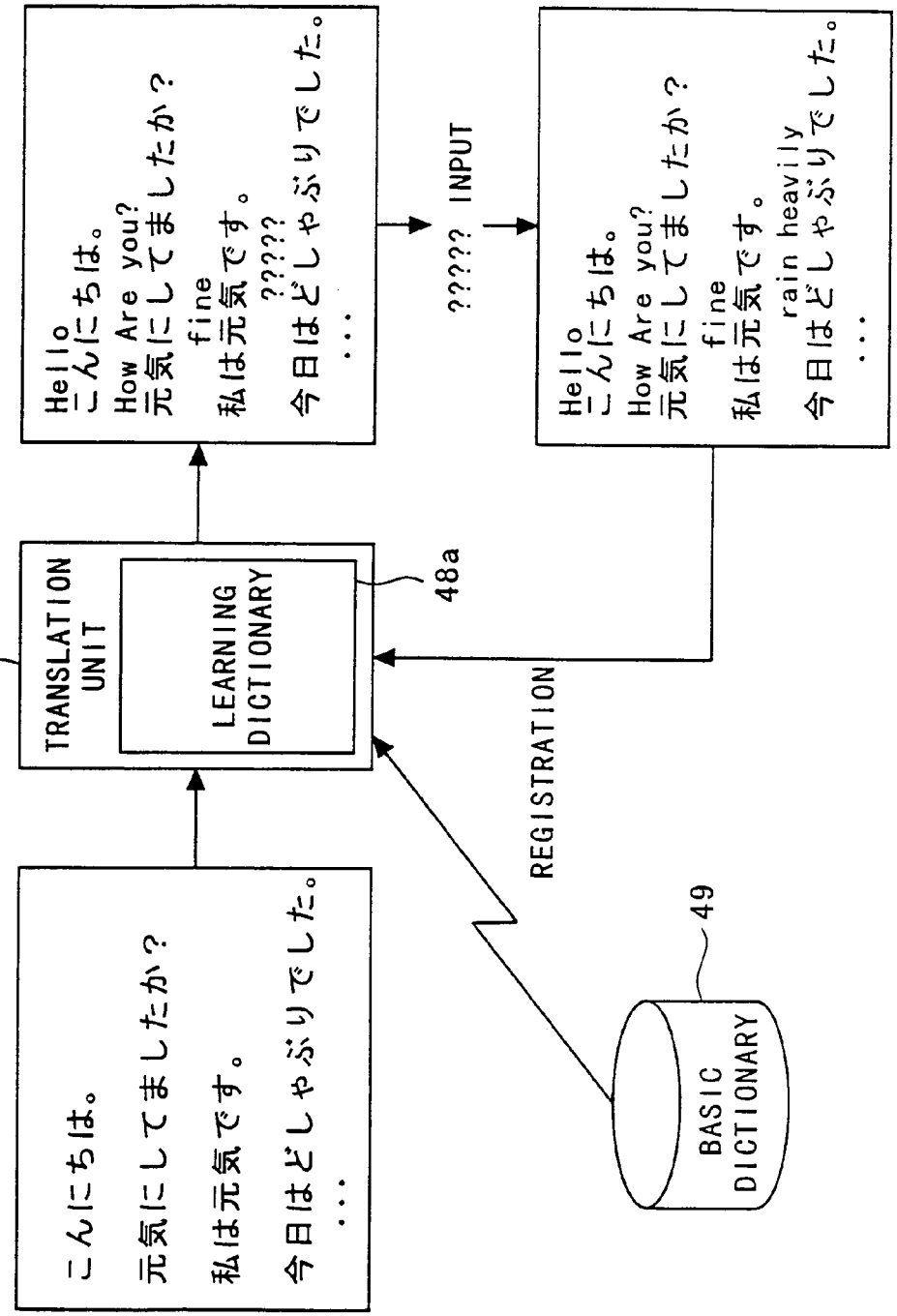
FIG. 8 is a diagram for explaining a process performed by the translation unit shown in FIG. 4.

FIG. 8 is a diagram for explaining a process performed by the translation unit 48. The translation unit 48 has a learning function, and words and idioms obtained by the learning function are registered on a learning dictionary 48*a* included in the translation unit 48. In this manner, the translation unit 48 reflects past translation results on the present translation process.

In this example, the translation unit 48 translates Japanese into English as a translation corresponding to the destination "Bob", and translates. Japanese into Germany as a translation corresponding to the destination "Mizel".

FIG. 9 is a diagram for explaining an internal process in which the translation unit 48 translates the Japanese sentence shown in FIG. 6. FIG. 9A shows a translation from Japanese to English performed by the translation unit 48, and FIG. 9B shows a translation from Japanese to German performed by the translation unit 48.

The translation unit 48 is a function realized such that the CPU 16 executes a translation program. As the translation program, any conventional translation programs may be used.

<<Step S05>>

In step S05, the second determination unit 50 checks whether characters expressed in languages in destinations selected in step 302 can be displayed by the terminal device T1. More specifically, the second determination unit 50 holds the information of a character code which can be handled by the terminal device T1.

In this example, the terminal device T1 can handle the JIS code, and can text-display hiragana, katakana, kanji, roman letters, and the like. However, the terminal device T1 cannot text-display characters obtained by adding umlauts to the roman letters.

Therefore, the second determination unit 50 determines that English translation results of the destination "Bob" can be text-displayed, and determines that German translation results of the destination "Mizel" cannot be text-displayed. If it is determined that it is possible to perform text display, the second determination unit 50 notifies the display device 41 that it is possible to perform text display. If it is determined that it is impossible to perform text display, the second determination unit 50 notifies the image forming unit 43 that it is impossible to perform text display.

The second determination unit 50 is a function realized such that the CPU 16 executes a program.

<<Step S06>>

In step S06, the display device 41 receives translation results from the translation unit 48 in accordance with a notification from the second determination unit 50. The display device 41 forms text data corresponding to words and idioms included in the translation results and translated into a foreign language which can be text-displayed in the terminal device T1 to holds the text data as a text file.

<<Step S07>>

In step S07, the image forming unit 43 receives translation results from the translation unit 48 in accordance with a notification from the second determination unit 50. The image forming unit 43 forms image data corresponding to words and idioms included in the translation results and translated into a foreign language which can be text-displayed in the terminal device T1 by using the font set 44 to hold the image data as an image file.

The font set 44 is stored in the ROM 17, the hard disk, or the FD 29, and includes font (character image) data of characters for writing a foreign language, which cannot be text-displayed in the terminal device T1, of the n languages described above. For example, the font set 44 includes the font data of characters for writing German.

Figure 10:
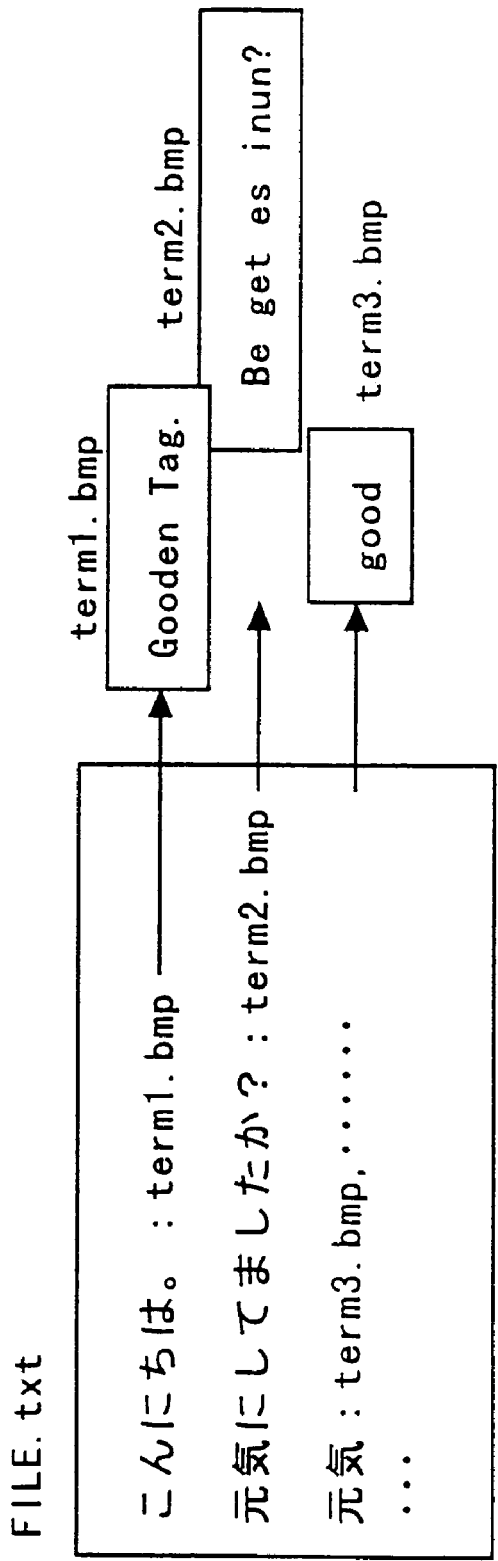
FIG. 10 is a diagram for explaining image file formation performed by the image forming unit shown in FIG. 4.
Figure 11:
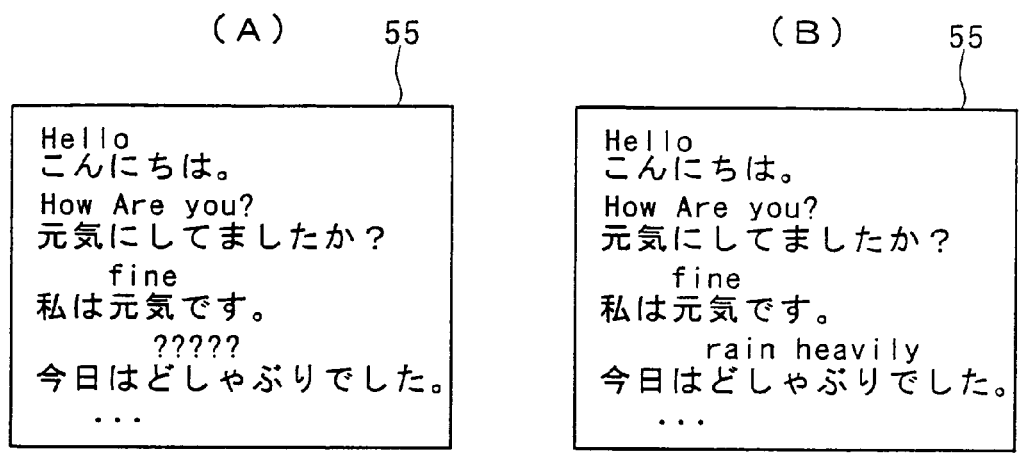
FIG. 11 is a diagram for explaining an edition screen.
Figure 12:
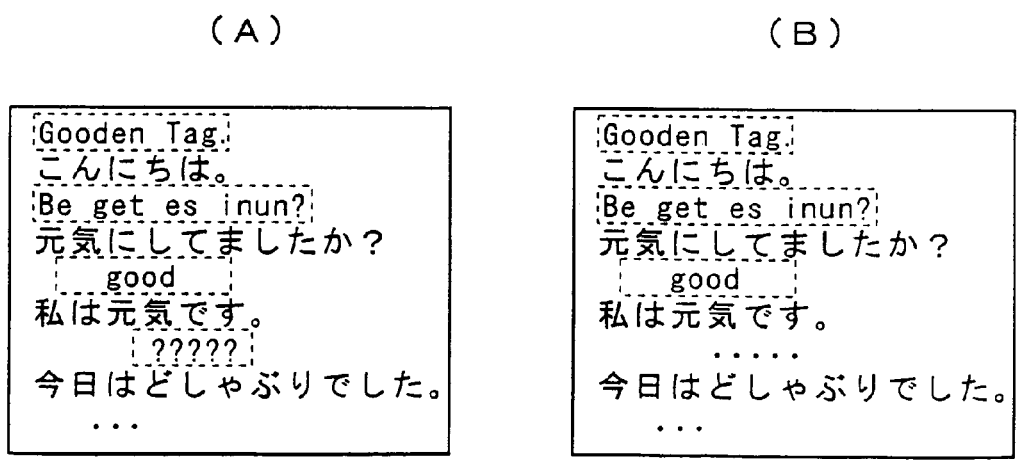
FIG. 12 is a diagram for explaining an edition screen.

FIG. 10 is a diagram for explaining image file formation performed by the image forming unit 43. FIG. 10 shows, for example, a case in which the image files of words translated into Germany is formed. As shown in FIG. 10, the image files (bit map files) of translated sentences are sequentially formed to an original pattern.

The image forming unit 43 forms image data by using the font data included in the font set 44 on the basis of the font size of the text data formed in step S01. At this time, the font size of the image data may be made equal to the font size of the text data, or the font size of the image data may be expanded or reduced with respect to the font size of the text data.

In this example, the image forming unit 43 forms the image file (e.g., bit map file) of translation results (words and idioms translated into German) with respect to the destination "Mizel".

The image forming unit 43 is a function realized such that the CPU 16 executes a program.

<<Step S08>>

In step S08, the display control unit 42 displays the edition screen of each destination on the display device 26. More specifically, the display control unit 42 displays an edition screen in the edition region 55. In the edition screen, the text file formed in step S01 and the text file formed in step S06 are laid out in accordance with predetermined format information.

The format information includes information of a position (left-end position of the sentences) representing a position at which the Japanese sentences are started, a line space of characters, and a width between lines (right-end position of the edition region 55). The display control unit 42 displays the text of a translated word or idiom at a corresponding position of an imaginary sheet (text display sheet) on which the Japanese sentences are arranged in the edition region 55.

More specifically, in the edition region 55, Japanese sentences are text-displayed at intervals each corresponding to one line. The words and idioms translated into a foreign language are text-displayed above the corresponding Japanese sentences such that the words and the idioms are adjusted to the left side.

FIG. 11A is a diagram showing a display example of an edition screen corresponding to the destination "Bob", and FIG. 11B is a diagram showing a manner obtained after an edition operation is performed to the edition screen shown in FIG. 11A.

On the other hand, the image file is formed in step S07, the display control unit 42 displays an edition screen on which the text file formed in step S01 and the image file formed in step S07 are laid out in accordance with the predetermined format information on the edition region 55.

Figure 13:
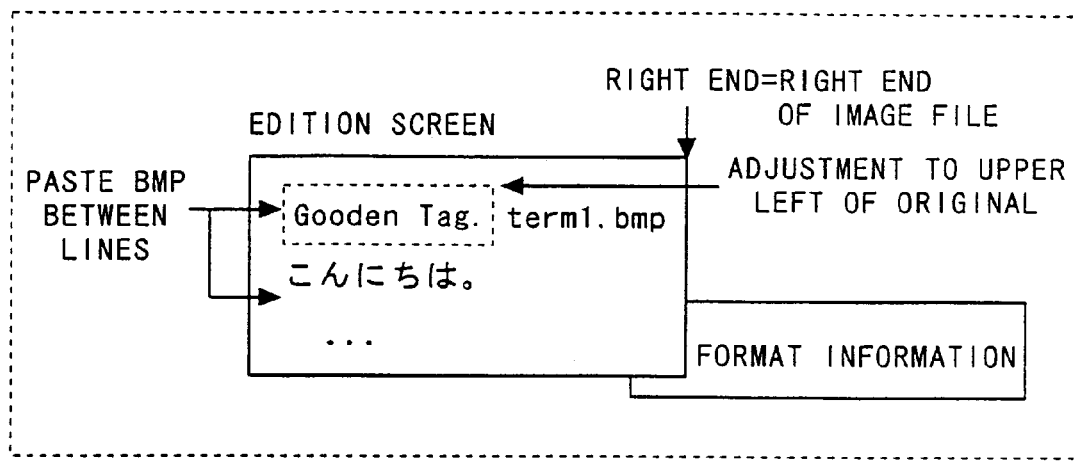
FIG. 13 is a diagram for explaining display control performed by the display control unit shown in FIG. 4.

FIG. 12A is a diagram showing a display example of an edition screen corresponding to the destination "Mizel", and FIG. 12B is a diagram showing a manner obtained after an edition operation is performed to the edition screen shown in FIG. 12A. FIG. 13 is a diagram for explaining display control performed by the display control unit 42.

The format information includes information of a position (left-end position of the sentences) representing a position at which the Japanese sentences are started, a line space of characters, and a width between lines (right-end position of the edition region 55) As shown in FIG. 13, the display control unit 42 pastes the image of a translated word or idiom at a corresponding position of an imaginary sheet (text display sheet) on which the Japanese sentences.

FIG. 13 shows an example in which a document image "Gooden Tag." (file name: term1.bmp) is pasted above a Japanese sentence "konnichiwa". According to this method, Japanese sentences are text-displayed as an edition screen at intervals each corresponding to one line in the edition region 55 shown in FIG. 12A. The document image (portion enclosed by a broken line in FIG. 12A) of the translated word or idiom is displayed above the Japanese sentence corresponding to the word or idiom such that the word or the idiom is adjusted to the left side.

A user refers to the displayed translated sentence. If there is a mistranslation, the user operates the KBD 27 to correct the mistranslation. The display control unit 42 displays a symbol "?????" above a word which cannot be translated. The user operates the KBD 27 to input the equivalent of the word in place of the symbol "?????" (see FIG. 11B).

Figure 14:
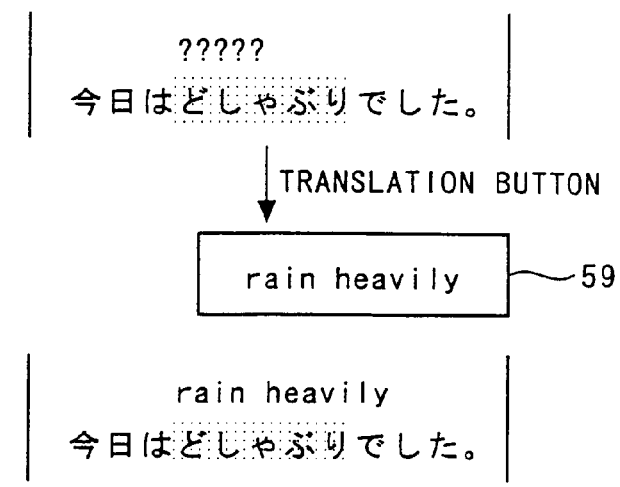
FIG. 14 is a diagram for explaining an editing operation.

FIG. 14 is a diagram for explaining an editing operation. As shown in FIG. 14, the user operates the KBD 27 to select a portion to be translated or corrected in the Japanese sentences displayed on the edition screen (edition region 55), and marks (inverts) the corresponding portion.

When the user presses the translation button 56 by using the KBD 27 or the mouse 28, the display control unit 42 displays a translated word display window 59 at a predetermined position of the edition region 55 such that the translated word display window 59 overlaps the text display sheet. The translated word display window 59 may be displayed at any position on the screen of the display device 26.

On the other hand, the translation unit 48 translates the marked portion into a foreign language (English in an example in FIG. 14) corresponding to a destination, and gives the translation results to the display control unit 42. The display control unit 42 text-displays the translation results (translated words) on the translated word display window 59. At this time, when the translation results are not proper, the user can correct the translated words displayed on the translated word display window 59 by the operation of the KBD 27.

When the translation results cannot be text-displayed, the translated words are image-displayed on the translated word display window 59. When the user is to correct the image-displayed translated words, the user designates the code of fonts for forming the translated words.

At this time, the corresponding font data is read from the font set 44, the image file of desired translated words is formed by the image forming unit 43, and the image of the translated words is displayed on the translated word display window 59 by the display control unit 42.

Thereafter, when the user fixes the translated words displayed on the translated word display window 59 by the operation of the KBD 27 or the mouse 28, the translated words are image-displayed above the marked Japanese sentence. In this manner, if translated words or a translated sentence written in a foreign language is displayed as either one of a text and an image, the user can edit the translated words or the translated sentence.

According to the method described above, translation results corresponding to the destination "Bob" and the destination "Mizel" are corrected (see FIG. 11B and FIG. 12B). Therefore, if the terminal device T1 cannot text-display German, words and idioms translated into German can be displayed on the display device 26 and can be edited.

The edition results (corrected contents) of the translation described above are reflected on the next translation by the learning function of the translation unit 48.

<<Step S09>>

In step S09, the third determination unit 51 checks whether the language in the transmission source can be text-displayed in the destination. More specifically, the third determination unit 51 refers to "display in Japanese" in records corresponding to destinations included in the address list 52 (see FIG. 7). When "display in Japanese" is "OK", the third determination unit 51 determines that it is possible to perform text display. When "display in Japanese" is "NG", the third determination unit 51 determines that it is impossible to perform text display.

In this example, the third determination unit 51 determines that it is impossible to perform text display in Japanese in the destination "Bob" (terminal device T2), and determines that it is possible to perform text display in Japanese in the destination "Mizel" (terminal device T3).

The third determination unit 51 is a function realized such that the CPU 16 executes a program.

<<Step S10>>

Figure 15:
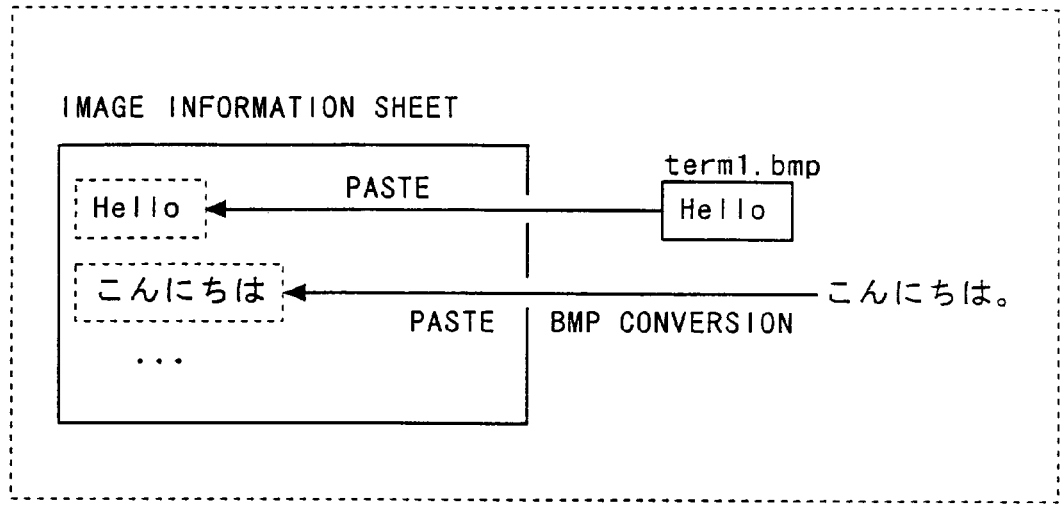
FIG. 15 is a diagram for explaining a synthesizing process performed by a synthesizing unit.
Figure 16:
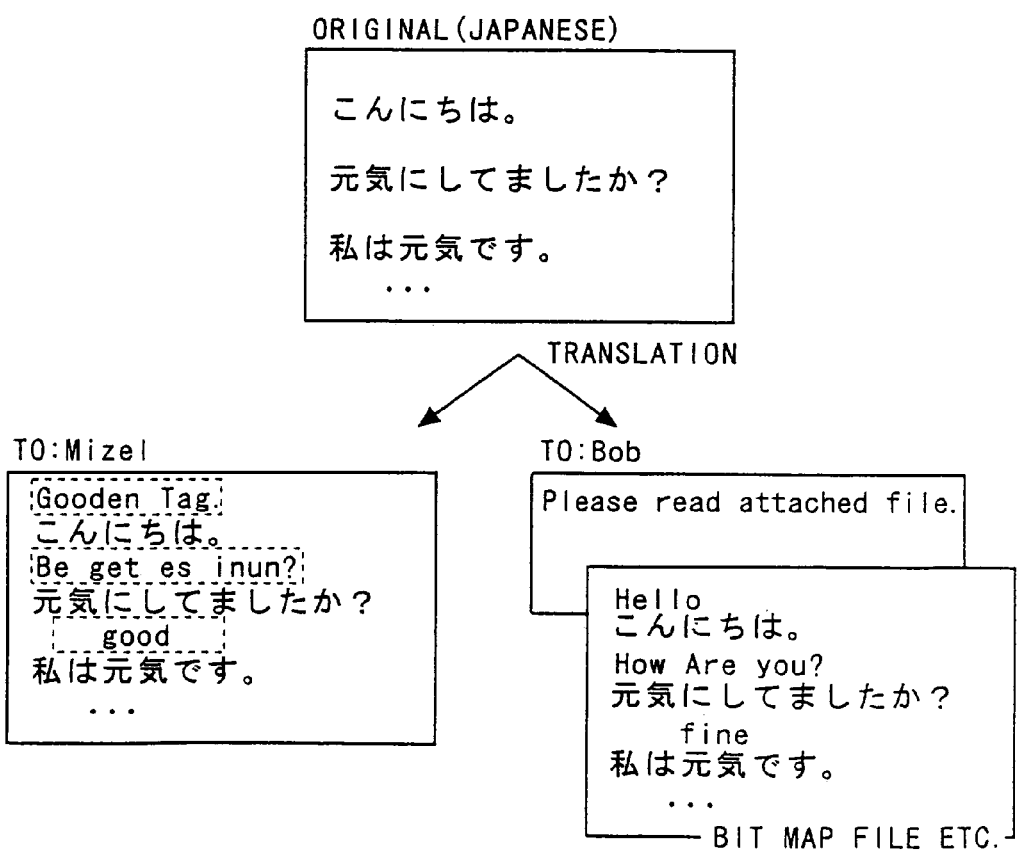
FIG. 16 is a diagram for explaining a process performed by a transmission unit.

In step S10, the synthesizing unit 45 forms a synthesized image file obtained by synthesizing an original (Japanese sentence) and a translated sentence. FIG. 15 is a diagram for explaining a synthesizing process performed by the synthesizing unit 45. The synthesizing unit 45 pastes the edited image files at predetermined positions in accordance with predetermined format information.

Subsequently, the synthesizing unit 45 converts the text file formed in step S01 into an image file (bit map file), and pastes the image file at a predetermined position. As a pre-process of this synthesizing process, it is determined in step S05 that the language in the destination can be text-displayed. When the image file of the translation results is not formed, the image file of the translation results is formed. In this manner, a synthesized image file obtained by synthesizing an original and a translated sentence is formed. In this example, a synthesized image file corresponding to the destination "Bob" is formed.

The synthesizing unit 45 is a function realized such that the CPU 16 executes a program.

<<Step S11>>

In step S11, the electronic mail formed in steps S01 to S10 is transmitted to the destination. More specifically, the contents of the electronic mail subjected to the process in step S08 or step S10 are displayed in the edition region 55.

At this time, when a user presses the transmission button 58 by the operation of the KBD 27 or the mouse 28, the transmission unit 46 transmits the formed electronic mail in accordance with the mail address.

In this case, when the sentence to be transmitted as an electronic mail is only a text file of a Japanese sentence (original), or when the Japanese sentence and the translated portion of the Japanese sentence are formed as text files, the transmission unit 46 transmits the contents of these text files as the body of the electronic mail in accordance with the mail address of the destination.

In contrast, when a Japanese sentence is formed as a text file, and when a translated portion is formed as an image file, a file corresponding to the display contents obtained upon completion of step S08. The transmission unit 46 transmits the formed file as an attached file.

In this example, in an electronic mail to the destination "Mizel", the Japanese sentence is formed as a text file, and the translated portion in German is formed as an image file. For this reason, a file obtained by combining the text file and the image file is formed, and this file is transmitted as an attached file to the destination "Mizel" (terminal device T3) (see FIG. 16).

In contract to this, the Japanese sentence and the translated portion are formed as image files, the display contents (synthesized image file) obtained upon completion of step S10 are transmitted as an attached file to the destination. The transmission unit 46 is a function obtained such that the CPU 16 and/or the communication control device 23 is operated in accordance with a predetermined control program.

In this example, the Japanese sentence and the translated portion of an electronic mail to the destination "Bob" are formed as image files. For this reason, the transmission unit 46 transmits the synthesized image file formed in step S10 as an attached file to the destination "Bob" (terminal device T2) (see FIG. 16).

At this time, the electronic mail may be directly transmitted to each destination, or the electronic mail may be uploaded from the terminal device T1 to a server in a network NW, and the terminal devices T2 and T3 may download the electronic mail transmitted from the terminal device T1 from the server as needed.

Thereafter, when the destination "Bob" starts a mailer in the terminal device T2 and opens the attached file in accordance with the sentence "Please read attached file." in the electronic mail transmitted in step S11, the image constituted by the Japanese sentence and the translated portion is displayed on the display device of the terminal device T2.

When the destination "Mizel" starts a mailer in the terminal device T3 and opens the electronic mail transmitted in step S11, the contents of the electronic mail in which the Japanese sentence is text-displayed and the translated portion is image-displayed are displayed on the display device of the terminal device T3.

In the description of steps 301 to S11, the process related to the destination "Bob" and the process related to the destination "Mizel" are performed in the steps in parallel. However, in fact, the processes in steps S01 to S11 are performed every destination. Note that the processes may be executed in parallel.

The above embodiment describes the example in which the present invention is applied to a terminal (terminal device T1) on a transmission side. However, the present invention is not limited to the terminal on the transmission side, and the present invention can also applied to another device in a network to which a terminal on a transmission side belongs or an device in a network to which a terminal on a reception side belongs.

As an example of the device, a mail server or a proxy server arranged on a network to which a terminal on a transmission side or a terminal on a reception side belongs, or the terminal on the reception side is known.

Since the hardware configuration of a mail server for executing the processes in the present invention may be the same as that of the terminal device T1 described by using FIG. 2, a description thereof will be omitted. However, when the present invention is executed by a mail server, several constituent elements such as the display 26, the keyboard 27, and the mouse 28 are necessary.

<Process in Mail Server>

Figure 17:
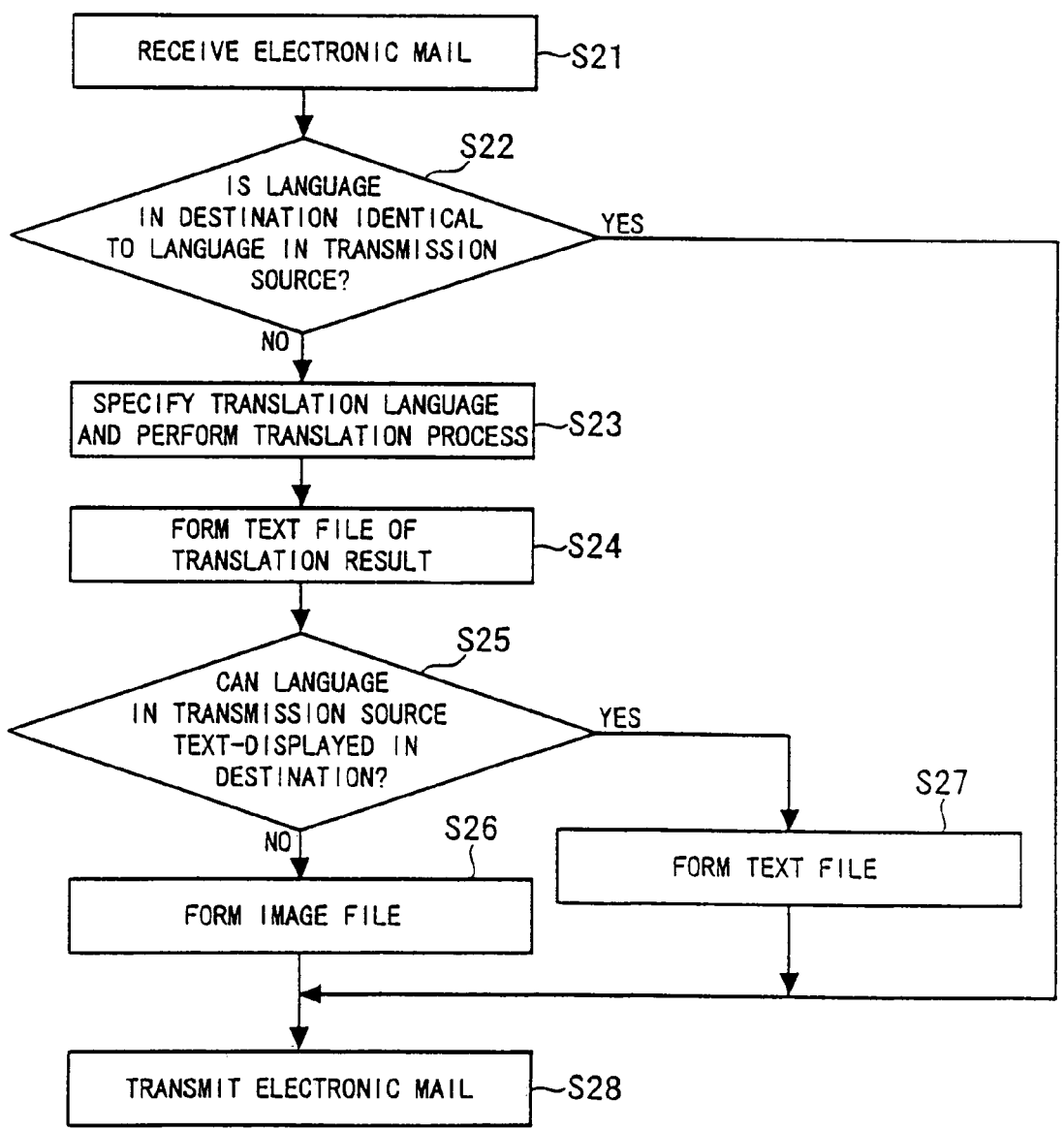
FIG. 17 is a flow chart showing an operation of the present invention performed by a mail server.

The mail server functions as an electronic mail apparatus which performs the following operations such that the CPU executes a program. FIG. 17 is a flow chart showing operations in the mail server.

First, the mail server receives an electronic mail in which a sentence (body) is written in the mother tongue of a user of the terminal device T1 from the terminal device T1 (step S21). More specifically, when the CPU executes a reception program for an electronic mail to receives the electronic mail transmitted from the terminal device T1.

It is checked whether the language identical to that in the terminal device T1 serving as the transmission source of the electronic mail is used in the destination or not (step S22). At this time, if it is determined the languages are identical to each other, the operation shifts to step S22. If it is determined that the languages are different from each other, the operation shifts to step S23.

The above determination is performed by the CPU such that prepared determination data is used. However, the CPU may find a language used in the destination on the basis of country information included in the destination address of the electronic mail received in step S21 to automatically check whether the language used in the transmission source is identical to the language used in the destination.

In step S23, the language (mother tongue) in the destination is specified, and the contents (body) of the electronic mail received in step S21 are translated in the specified language. However, the CPU may find a language on the basis of the destination address.

In step S24, after the CPU forms the text file of results (translation results) of the translation process in step S23, the operation shifts to step S25.

In step S25, it is checked whether the characters written in the language (Japanese) of the transmission source can be text-displayed in the destination or not.

In step S26, the CPU forms image data corresponding to the text data of the body (sentence formed by characters written in the language in the transmission source) of the electronic mail received in step S21 and forms image data corresponding to the text data of the translation results on the basis of the text file of the translation results formed in step S24 to form a synthesized image file obtained by synthesizing these image data.

In step S27, the CPU forms text data obtained by synthesizing the body (sentence formed by characters written in the language in the transmission source) of the electronic mail received in step S21, the text data of the translation results, and the text data of the body of the electronic mail to form a text file.

In step S28, the CPU transmits the electronic mails formed in the above steps to a destination indicated by the header information of the electronic mail received in step S21.

The transmitted electronic mail is as follows.

(1) If "YES" is determined in step S22, the sentence (the body of the received mail) formed in the language in the transmission source is directly used.

(2) If "NO" is determined in step S22, and if "YES" is determined in step S25, a sentence obtained by synthesizing the body of the received electronic mail and the contents of the text file of the translation results is used as the body of the electronic mail.

(3) If "NO" is determined in step S22 and step S25, a synthesized image file obtained by synthesizing the image file formed from the body of the received electronic mail and the image file of the translation results is used as an attached file.

<Detailed Operation of Mail Server>

Figure 18:
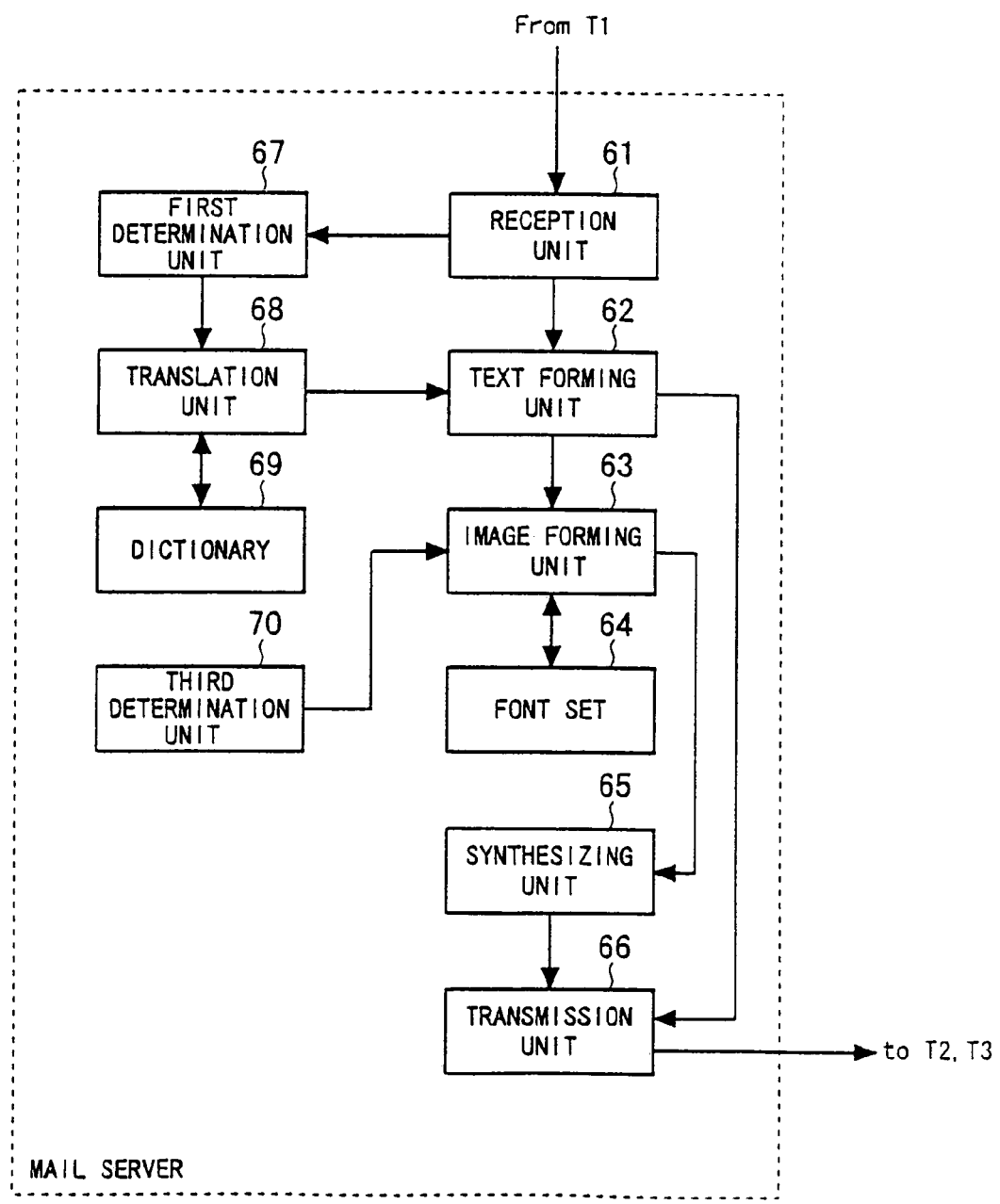
FIG. 18 is a functional block diagram of a mail server for performing the present invention.

FIG. 18 is a functional block diagram of the mail server. In the mail server, the CPU executes a program to perform the operations in steps S21 to S28 described above. In this manner, the mail server functions as a device comprising a reception unit 61, a text forming unit 62, an image forming unit 63, a font set (data set of fonts) 64, a synthesizing unit 65, a transmission unit 66, a first determination unit 67, a translation unit 68, a dictionary 69, and a third determination unit 70 as shown in FIG. 18.

The details of steps S21 to S28 shown in FIG. 17 will be described below by using FIG. 18.

<<Step S21>>

In step S21, an electronic mail, transmitted from the terminal device (transmission source terminal) T1 of the transmission source, in which a sentence (body) is written in a mother tongue by a user of the transmission source terminal T1 is received by the reception unit 61.

<<Step S22>>

In step S22, the first determination unit 67 checks whether the language in the destination indicated by the header information of the electronic mail received in step S21 is identical to the language in the transmission source or not. More specifically, the first determination unit 67 holds a plurality of records including at least information representing that Japanese is used as the language in the transmission source and pieces of information corresponding to the items "mail address", "mother tongue", and "display in Japanese" of the address list 52 shown in FIG. 7 as determination data in advance. The first determination unit 67 checks whether the "mother tongue" in the records corresponding to the destination mail address is Japanese or not.

In this manner, the first determination unit 67 automatically performs determination by using the information of the language (Japanese) in the transmission source prepared as determination data and the information of the "mother tongue" corresponding to the destination mail address.

When the language in the transmission source is different from the language in the destination (when the language in the destination is not Japanese), the first determination unit 67 notifies the translation unit 68 that these languages are different from each other. In contrast to this, when the language in the destination is Japanese, the first determination unit 67 does not notify the translation unit 68. The first determination unit 67 is a function realized such that the CPU executes a program.

<<Step S23>>

In step S23, the translation unit 68 is started by receiving a notification from the first determination unit 67, and performs the following processes. More specifically, the translation unit 68 refers to the "mother tongue" in the records corresponding to the destination in which it is determined that the language is not Japanese. In this manner, the translation unit 68 specifies a language to be translated. The first determination unit 67 may specify a language to be translated to notify the translation unit 68.

Subsequently, the translation unit 68 refers to the dictionary (basic dictionary) 69. In this manner, the translation unit 68 transmits the body (Japanese sentence) of the electronic mail received in step S21 into the specified language. In this case, the dictionary 69 is constituted by dictionaries for n languages such as a Japanese-English dictionary or a Japanese-German dictionary for translating Japanese into a foreign language.

When the translation unit 68 translates the Japanese sentence, the translation unit 68 extracts words or idioms of one sentence to translate the extracted words or idioms into the corresponding foreign language. When the words or the idioms are extracted, for example, decomposition of parts of speech is performed by explosion morpheme analysis, and a translation for a specific part of speech (e.g., noun or verb) is performed.

The translation unit 68 does not output translation results to a word which is not described in the dictionary 69. The translation unit 68 may translate not only the words and idioms in one sentence but also the whole sentence.

The translation unit 68 is a function realized such that the CPU executes a translation program, and any conventional translation program can also be used as the translation program.

<<Step S24>>

In step S24, the text forming unit 62 receives translation results from the translation unit 68. The text forming unit 62 forms text data corresponding to a words and idioms included in the translation results and translated into a foreign language to hold the image data as a text file.

<<Step S25>>

In step S25, the third determination unit 70 checks whether the language (the body of the received electronic mail) in the transmission source can be text-displayed in the destination or not. More specifically, the third determination unit 70 refers to the "display in Japanese" in the records corresponding to the destination and included in the held determination data. At this time, if the display in Japanese is "OK", the third determination unit 70 determines that it is possible to perform text display. If the display in Japanese is "NG", the third determination unit 70 determines that it is impossible to perform text display. The third determination unit 70 is a function realized such that the CPU executes a program.

<<Step S26>>

In step S26, the image forming unit 63 forms image data corresponding to the text data of the body of the received electronic mail and the translation results (translated portions) by using the text data. More specifically, the image forming unit 63 forms image data on the basis of the text data of the body of the received electronic mail by using a Japanese font data included in the font set 64.

The image forming unit 63 forms image data on the basis of the text data of the translation results by using the font data of the mother tongue included in the font set 64 and used in the destination of the electronic mail. A font size for forming the image data is set in advance.

The synthesizing unit 65 synthesizes the image data of the formed Japanese sentence and the translated portion according to predetermined format information (line space, line width, and the like) such that the Japanese sentence and the translated portion are paired, thereby forming an image file.

The image forming unit 63 and the synthesizing unit 65 are functions realized such that the CPU executes programs.

<<Step S27>>

In step S27, the synthesizing unit 65 forms a text file which is synthesized by using the text data of the body of the received electronic mail and the text file of the translation results formed by the text forming unit 62 such that the Japanese sentence and the text data of the translated portion are paired.

<<Step S28>>

In step S28, the transmission unit 66 transmits the electronic mails constituted by the contents formed by the above processes to a destination. More specifically, when the image file constituted by the Japanese sentence and the translated portion is formed in step S26, an electronic mail in which the image file is used as an attached file and a sentence (e.g., "Please read attached file.") attached with a file is used as a body is transmitted to the destination.

When a text file constituted by a Japanese sentence and the translated portion thereof is formed in step S27, an electronic mail in which the text data of the text file is used as a body is transmitted to the destination. As described above, the present invention can also be performed in a device other than a transmission source terminal (terminal device T1).

Although the device connected to a network to which a transmission source terminal belongs has been described above, the present invention can be performed even in a device connected to a network to which the terminal device of a destination (destination terminal) belongs. In this case, the item "mail address" is set to be a transmission source mail address, the item "mother tongue" is set to be the mother tongue of a user of the transmission source mail address, and the item "display in Japanese" is set to be information representing whether the mother tongue of the transmission source can be displayed or not.

Therefore, when the item "mother tongue" corresponding to the transmission source mail address of the received electronic mail is different from the mother tongue used in the destination terminal, the body of the received electronic mail is translated. When it is represented that the mother tongue in the transmission source can be displayed, a test file constituted by the body of the received electronic mail and the translated portion of the body is formed; otherwise, an image file constituted by the body of the electronic mail and the translated portion of the body is formed. After the same synthesizing process as described above is performed, the image file is transmitted to the destination terminal by a predetermined method.

In this manner, the present invention can be applied to either one of the device on the transmission source side and the device on the destination side. In contrast to this, in a device other then the terminal device of the transmission source, the translated portion of the formed original (Japanese sentence) cannot be edited. Therefore, when the present invention is applied to the terminal device of the transmission source, a translation having the highest precision can be performed, and a receiver of the electronic mail easily understands the contents of the electronic mail.

In addition, according to the present invention, there are a case in which the image data of a sentence (original) input as the contents of an electronic mail and the text data of the translated sentence are transmitted to the destination of the electronic mail and a case in which both the original and the translated sentence of the original are translated as image data.

These cases have advantages, respectively. In the former case, since the translated sentence is text data, the capacity of data to be transmitted to the destination of the electronic mail can be suppressed. In the later case, since both the data are image data, the terminal device (destination terminal) on the reception side does not require a function in which, as in the former case, the received text data and the image data are synthesized with each other to be displayed and which is not held by a general electronic mail apparatus (electronic mail software), and an electronic mail apparatus used as present can be directly used.

<Operation of Embodiment>

According to the electronic mail apparatus according to the embodiment described above, when characters (hiragana, katakana, and kanji) for writing Japanese cannot be text-displayed in a destination, the image of a sentence constituting the contents of an electronic mail formed in Japanese is formed, and the image is transmitted to the destination.

In this manner, in the destination, a sentence formed in Japanese can be displayed on a display device. For this reason, a receiver of an electronic mail in the destination can read an electronic mail formed in Japanese. The embodiment has been described with respect to Japanese. However, the same operation as described above when the embodiment is made for another language.

When words or idioms are translated, the translation results cannot be text-displayed in a transmission source. In this case, an image file corresponding to the translation results is formed, and a document image based on the image file is displayed on the display device 26. For this reason, a person who forms an electronic mail refers to the translation results, and can edit (correct) the translation results.

In the embodiment described above, format information is held to lay out an image in a text sentence. However, in place of this, a configuration may be formed such that a line space and the like are determined in accordance with the font size of the text.

In this case, information (the position of the left end, a line space, and a line width (the position of the right end)) required to lay out an image can be calculated such that position information of Japanese sentences, line space information, and the position of the right end of the longest sentence in the sentences are calculated on the basis of the font size of the Japanese sentences.

In this embodiment, although a Japanese sentence and the translated portion thereof are displayed on the same screen, the Japanese sentence and the translated portion thereof may be displayed on different screens, respectively. At this time, the two screens may be displayed to be arrayed, and one of the two screens may be displayed by screen switching.

In addition to the invention described in Claims, a device and method for performing the following processes and a recording medium on which a program for causing a computer to execute the processes is recorded are included in the present invention.

The process contents are as follows. That is, when, by using a sentence input as the contents of an electronic mail, image data corresponding to the sentence is formed, and when the sentence is expressed in a language different from a language used in a destination of the mail, the sentence is translated into the language used in the destination. The text data of the translation results is editably displayed on a screen, and the formed image data and the translation results are transmitted to the destination of the electronic mail.

In this manner, a correcting operation of the translation results corresponding to the input sentence can be performed, and the appropriately corrected translated sentence and the image data of the sentence serving as the original can be transmitted to the destination.

The translated text data may be displayed such that the text data corresponds to the sentence. In this manner, the correspondence between the input sentence and the translated sentence thereof can be easily understood, and the correcting operation can be easily performed.

In addition, the other process contents are as follows. That is, when, by using a sentence input as the contents of an electronic mail, image data corresponding to the sentence is formed, and when the sentence is expressed by characters written in a language different from a language used in a destination of the electronic mail, the sentence is translated into the language used in the destination. Translated image data corresponding to the translation results is formed by the characters written in the language used in the destination, the translated image data is editably displayed to correspond to the sentence, and the formed image data and the translation results are transmitted to the destination of the electronic mail.

In this manner, characters written in the language which cannot be text-displayed in the transmission source and is used in the destination can be displayed, and a correcting operation for the translation results corresponding to the input sentence can be performed. Therefore, the appropriately corrected translated sentence and the image data of the sentence serving as the original can be transmitted to the destination.

What is claimed is:

1. An electronic mail apparatus, comprising:
a storing unit storing information in response to a destination of an electronic mail, the information indicating whether a sentence to be included in the electronic mail is text-displayable based on text data and a character code system used at the destination of the electronic mail;
a judging unit judging whether to form image data of a text file corresponding to the sentence based on the information stored in the storing unit;
an image data forming unit forming the image data of the text file corresponding to the sentence when the judging unit judges that the image data of the text file corresponding to the sentence should be formed;
a transmission unit transmitting the electronic mail with the image data of the text file corresponding to the sentence to the destination of the electronic mail;
a translation unit translating the sentence into a language used at the destination when the sentence is expressed by characters written in a language different from the language used at the destination of the electronic mail, the image data forming unit forming the translated image data of translation results expressed by characters written in the language used at the destination when the display control unit cannot text-display the characters written in the language used at the destination of the electronic mail;
an edition unit outputting the text file with Japanese words and English words one on top of the other; and
a synthesizing unit forming synthesized image data obtained by combining image data formed by the image data forming unit and corresponding to the input sentence with the translated image data, the synthesized image data including the image data of the sentence described by at least two lines and the translated image data of the translation results of the sentence inserted between the at least two lines, the transmission unit transmitting the synthesized image data to the destination of the electronic mail.

2. An electronic mail transmission method, comprising:
receiving a sentence serving as contents of an electronic mail;
reading out information in response to a destination of the electronic mail from a storing unit, the information indicating whether the sentence is text-displayable based on text data and a character code system used at the destination of the electronic mail;
judging whether to form image data of a text file corresponding to the sentence based on the information read out from the storing unit;
translating the sentence into a language used at the destination when the sentence is expressed by characters written in a language different from the language used at the destination of the electronic mail;
editing a text file with a Japanese sentence and an English translation sentence;
outputting an edited text file with the Japanese sentence and the English translation sentence one on top of the other;
forming the image data of the text file corresponding to the sentence when it is judged that the image data of the text file corresponding to the sentence should be formed, and translated image data of translation results expressed by characters written in the language used at the destination, when it is determined that the characters are not written in the text-displayable language used at the destination of the electronic mail;
forming synthesized image data obtained by combining the image data corresponding to the sentence with the translated image data, the synthesized image data including the image data of the sentence described by at least two lines and the translated image data of the translation results of the sentence inserted between the at least two lines; and
transmitting the electronic mail with the synthesized image data of the text file corresponding to the sentence to the destination of the electronic mail.

3. A computer-readable recording medium which records a program that when executed controls a computer to perform a method comprising:
receiving a sentence serving as contents of an electronic mail;
reading out information in response to a destination of the electronic mail from a storing unit, the information indicating whether the sentence is text-displayable based on text data and a character code system used at the destination of the electronic mail;
judging whether to form image data of a text file corresponding to the sentence based on the information read out from the storing unit;
translating the sentence into a language used at the destination when the sentence is expressed by characters written in a language different from the language used at the destination of the electronic mail;

editing a text file with a Japanese sentence and an English translation sentence;

outputting an edited text file with the Japanese sentence and the English translation sentence one on top of the other;

forming the image data of the text file corresponding to the sentence when it is judged that the image data of the text file corresponding to the sentence should be formed, and translated image data of translation results expressed by characters written in the language used at the destination, when the characters written in the language used in the destination of the electronic mail cannot be text-displayed;

forming synthesized image data obtained by combining the image data corresponding to the sentence with the translated image data, the synthesized image data including the image data of the sentence described by at least two lines and the translated image data of the translation results of the sentence inserted between the at least two lines; and transmitting the synthesized image data to the destination of the electronic mail.

4. An electronic mail apparatus, comprising:

a storing unit storing information in response to a destination of an electronic mail, the information indicating whether a sentence to be included in the electronic mail is text-displayable based on text data and a character code system used at the destination of the electronic mail;

a judging unit judging whether to form image data of a text file corresponding to the sentence based on the information stored in the storing unit;

an image data forming unit forming the image data of the text file corresponding to the sentence when the judging unit judges that the image data of the text file corresponding to the sentence should be formed;

a transmission unit transmitting the electronic mail with the image data of the text file corresponding to the sentence to the destination of the electronic mail;

a translation unit translating the sentence into a language used at the destination when the sentence is expressed by characters written in a language different from the language used at the destination of the electronic mail, the image data forming unit forming the translated image data of translation results expressed by characters written in the language used at the destination when the display control unit cannot text-display the characters written in the language used at the destination of the electronic mail; and a synthesizing unit forming synthesized image data obtained by combining image data formed by the image data forming unit and corresponding to the input sentence with the translated image data, the synthesized image data including the image data of the sentence described by at least two lines and the translated image data of the translation results of the sentence with English on top and Japanese on the bottom inserted between the at least two lines, the transmission unit transmitting the synthesized image data to the destination of the electronic mail.

5. An electronic mail transmission method, comprising:

receiving a sentence serving as contents of an electronic mail;

reading out information in response to a destination of the electronic mail from a storing unit, the information indicating whether the sentence is text-displayable based on text data and a character code system used at the destination of the electronic mail;

judging whether to form image data of a text file corresponding to the sentence based on the information read out from the storing unit;

translating the sentence into a language used at the destination when the sentence is expressed by characters written in a language different from the language used at the destination of the electronic mail;

forming the image data of the text file corresponding to the sentence when it is judged that the image data of the text file corresponding to the sentence should be formed, and translated image data of translation results expressed by characters written in the language used at the destination, when it is determined that the characters are not written in the text-displayable language used at the destination of the electronic mail;

forming synthesized image data obtained by combining the image data corresponding to the sentence with the translated image data, the synthesized image data including the image data of the sentence described by at least two lines and the translated image data of the translation results of the sentence with English on top and Japanese on the bottom inserted between the at least two lines; and transmitting the electronic mail with the synthesized image data of the text file corresponding to the sentence to the destination of the electronic mail.

6. A computer-readable recording medium which records a program that when executed controls a computer to perform a method comprising:

receiving a sentence serving as contents of an electronic mail;

reading out information in response to a destination of the electronic mail from a storing unit, the information indicating whether the sentence is text-displayable based on text data and a character code system used at the destination of the electronic mail;

judging whether to form image data of a text file corresponding to the sentence based on the information read out from the storing unit;

translating the sentence into a language used at the destination when the sentence is expressed by characters written in a language different from the language used at the destination of the electronic mail;

forming the image data of the text file corresponding to the sentence when it is judged that the image data of the text file corresponding to the sentence should be formed, and translated image data of translation results expressed by characters written in the language used at the destination, when the characters written in the language used in the destination of the electronic mail cannot be text-displayed;

forming synthesized image data obtained by combining the image data corresponding to the sentence with the translated image data, the synthesized image data including the image data of the sentence described by at least two lines and the translated image data of the translation results of the sentence with English on top and Japanese on the bottom inserted between the at least two lines; and transmitting the synthesized image data to the destination of the electronic mail.

* * * * *